UPFLOW REGENERATION WITH POROUS TUBE

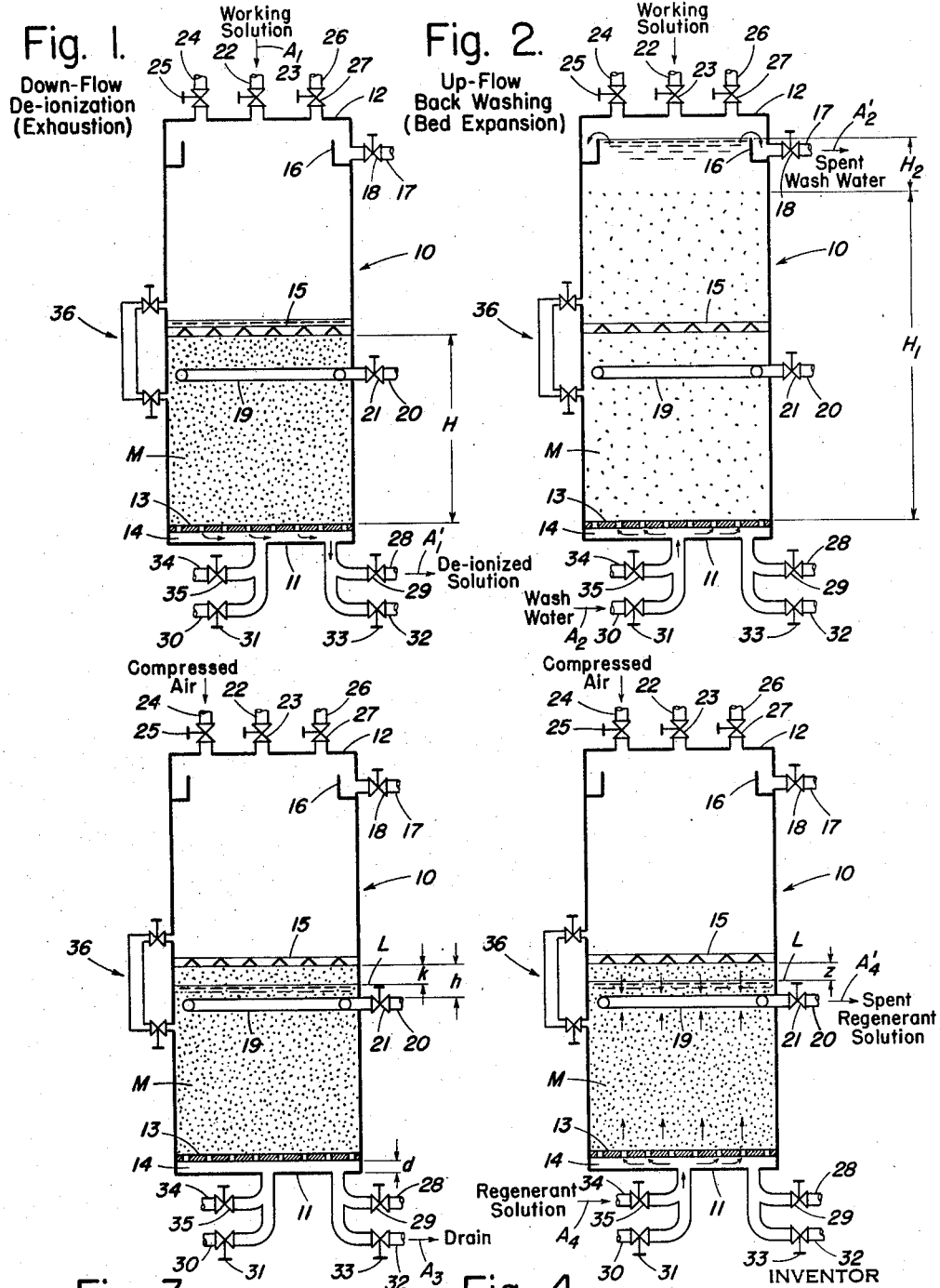

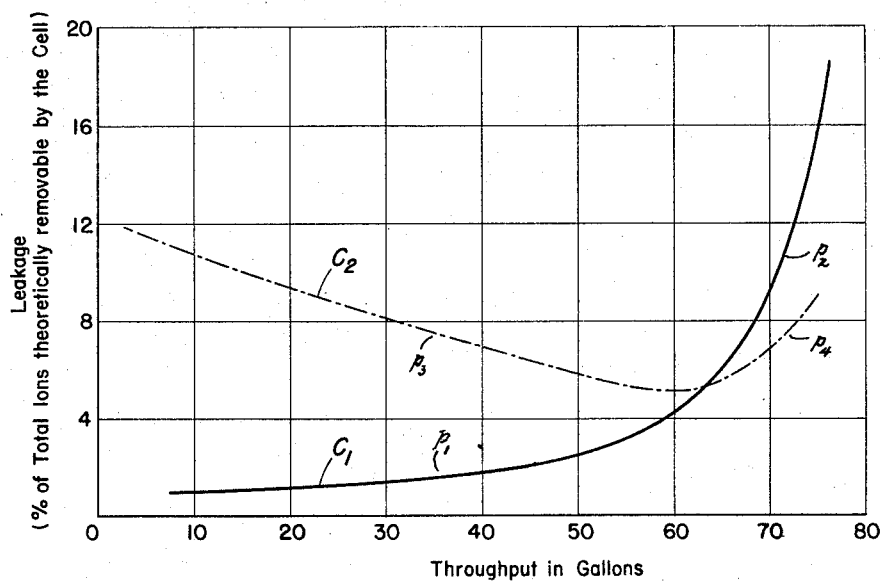
Fig. 7.
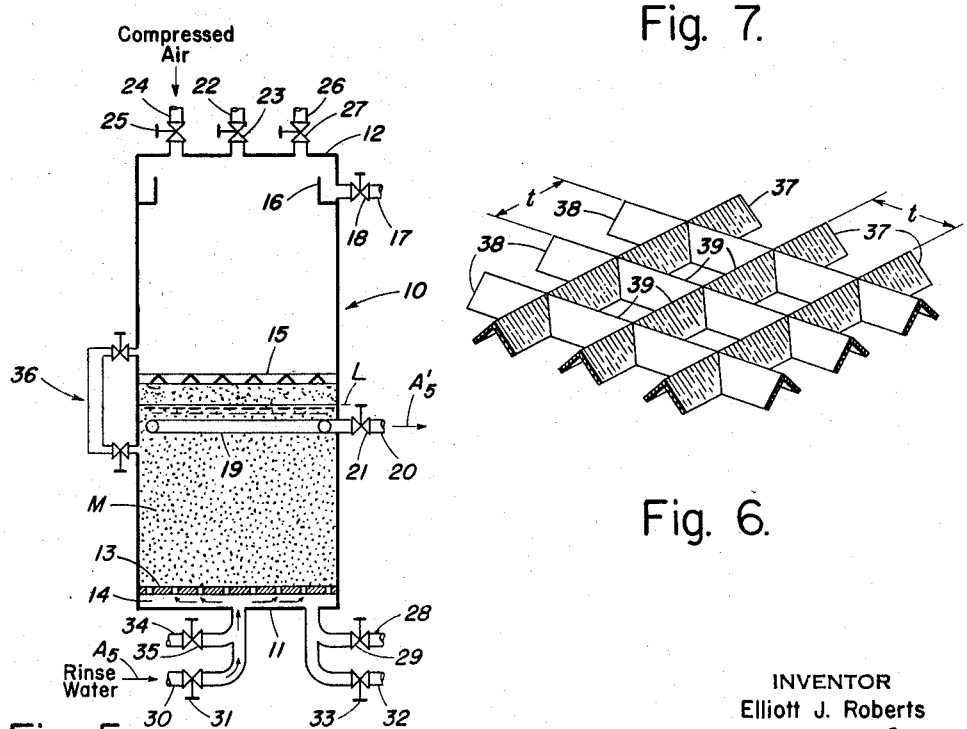
Fig. 5.
Up-flow Rinsing
Fig. 6.
INVENTOR
Elliott J. Roberts
BY
ATTORNEY 2,855,364

Elliott J. Roberts, Westport, Conn., assignor to Dorr-Oliver Incorporated, Stamford, Conn., a corporation of Delaware Application December 14, 1956, Serial No. 628,445

7 Claims. (Cl. 210—35)

This invention relates to ion exchange operation as for de-ionization treatment of solution in a non-continuous or cyclic fashion, an example being the removal of salt from sea water.

Such treatment is effected in an ion exchange system or cell containing a bed of granular ion exchange material through which there is passed a flow of the working solution to be de-ionized until the ion exchange capacity of the bed is sufficiently exhausted, and thereafter a flow of regenerant solution is passed through the bed for restoring the exchange capacity thereof.

More particularly, the invention relates to improvements in the practice of an ion exchange operating cycle in which the working solution is passed through the bed in one direction and the regenerant solution in the opposite direction. Since a practical mode of operation requires the regenerant solution to be upflowing, the term upflow regeneration is herein understood to be coupled with downflow of the working solution or downflow de-ionization. In fact, upflow regeneration treatment such as herein contemplated connotes the kind of ion exchange operating cycle in which de-ionization flow is downward, whereas regeneration flow is upward. The importance of such an upflow regeneration system lies in the fact that thereby the benefits of counter-current regeneration are theoretically realizable, such benefits being high efficiency in the utilization of the exchange material as well as of the regenerant solution, along with a high degree of removal of respective ions from the working solution with a minimum of undesired ions being found in the effluent of treated solution passing from the bottom of the ion exchange cell.

More precisely, treatment cycle such as herein contemplated comprises four main phases, namely (a) exhausting the bed by the passage therethrough of the working solution downwardly whereby the bed remains subsided, (b) backwashing the bed by an upflow of wash water therethrough of a high enough velocity to expand the bed into a state of teeter, and when washing is completed allowing the bed to subside by drainage of residual wash water, (c) regenerating the bed by upflow passage therethrough of regenerant solution while maintaining subsidence of the material (d) rinsing the bed to displace residual solution therefrom, by passing therethrough an upflow of rinse water, while maintaining subsidence.

Such efficiency benefits as are obtainable with upflow regeneration are due to the fact that the fresh full-strength regenerant solution entering the bottom end of the bed contacts a bottom strata of material that is normally never allowed to become fully exhausted, but the solution rising through the bed becomes gradually exhausted to the extent that when reaching the fully exhausted top strata of the bed it is substantially fully utilized. In brief, such high efficiency benefits are due to the fresh strong regenerant solution at the bottom contacting the exchange material that is only partially exhausted, while partially utilized regenerant solution contacts the fully exhausted initial strata of the exchange material at the top. In this way, there is theoretically realizable a high degree of removal of ions from the solution being treated, with a concurrent minimum of leakage of undesirable ions into the treated effluent solution.

However, an operational problem in the practice of this mode of operation lies in the fact that the bed of resin granules with upflow regenerant solution passing therethrough tends to expand, and upflow velocities excessively high or as high as operational efficiency demands will throw the particles into a state of teeter.

Thus, the efficiency of the operation suffers because of the lowered interstitial velocity of the regenerant solution relative to the granules. Especially, in the case of teeter condition there occurs a shifting or agitation of the granules within the expanded or teetering bed, so that the desired efficiencies theoretically obtainable are sharply impaired, which drawback is aggravated where particularly light resins or particularly dense solutions are encountered. Under such conditions the rate of upflow regeneration permissible or else the upflow rate of the regenerant solution, becomes limited to such an extent that, even where the material has inherently low regeneration rates, the efficiencies will fall well below those to be theoretically expected from the counter-current mode of regeneration.

It is an object of this invention to achieve those aforementioned theoretically obtainable regeneration efficiencies in the ion exchange cycle by way of upflow regeneration even though with high upflow velocities of the regenerant solution.

This object is obtainable by allowing spent regenerant solution to pass from the bed at an elevation that lies a distance below the top level of the bed when subsided. At the same time, controlled air pressure is maintained in the freeboard space above the bed, such that the regenerant solution level is maintained a distance below the top level of the bed. In this way there is maintainable a top zone of semi-dry exchange material above the regenerant solution level, which zone is of a depth that will provide a restraining blanket or layer which in turn counteracts the tendency of the bed to expand or to assume the aforementioned state of teeter as a result of the upflow velocities of the regenerant solution.

In order that the inactive top zone of semi-dry material may be kept reasonably small or else be minimized, there is provided according to this invention a bed-confining horizontal structure or gridwork disposed substantially in the plane of the top level of the bed of exchange material when subsided. The depth of the semi-dry zone together with this horizontal grid structure is to contain the bed against any tendency thereof to expand or to be thrown into teether, at least as long as the zone of semi-dry material is being maintained as such at the top of the bed.

Following the exhaustion phase, wash water is passed upwardly through the bed and on through the grid structure into the freeboard space above the bed. As the semi-dry material of the bed-restraining zone becomes wetted and submerged in the upflowing stream of wash liquid, it yields to the upflow rate and expands readily through the grid structure as the granules are thrown into full teeter to effect a thorough washing thereof in that state of suspension. The wash water is then drained to allow the granules to subside through the grid structure for reconstituting the bed in order that now a regenerant solution may be passed therethrough upwardly to effect regeneration treatment thereof.

According to one feature, the bed restraining horizontal grid structure is vertically adjustable, that is, from one horizontal plane to another. According to another feature, the effluent means for the spent regenerant solution are vertically adjustable. According to still another feature the grid structure and the means for the spent regenerant solution constitute a unitary structure.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

It is further to be understood that the practice of this invention is not limited to the embodiment herein illustrated in which de-ionization is downflow, whereas regeneration is upflow through the bed. That is to say, when desirable the operation is conducted with de-ionization upflow and regeneration in downflow direction to the bed.

In the drawings:

Figure 1 is a semi-dry diagrammatic showing of the downflow exhaustion phase of the ion exchange operating cycle, with the bed in a state of subsidence.

Figure 2 represents the upflow back washing phase, with a bed in a state of teeter.

Figure 3 shows the bed returned to a state subsidence at the completion of the teeter-washing phase.

Figure 4 represents the upflow regeneration phase, with restraining means effective to aid in maintaining the bed in a state of subsidence.

Figure 5 shows the upflow rinsing phase with the bed kept in a state of subsidence to displace residual regenerant solution.

Figure 6 is a detailed view of a bed-restraining grid structure.

Figure 7 is an operational chart illustrating the efficiency of the upflow ion exchange regeneration cycle in terms of ion exchange leakage plotted against total flow volume of working solution through the bed.

The ion exchange cell for practicing the ion exchange operating cycle of this invention is here diagrammatically shown in Figures 1 to 5 illustrating respective phases of the operating cycle.

The cell comprises a closed cylindrical container or tertical tank 10 having a bottom portion 11 and a top portion 12. Within the tank there is provided a false bottom in the form of a liquid-permeable so-called constriction plate 13 furnishing the support for a body or bed of granular ion exchange material "M." The constriction plate 13 is spaced a distance "d" from the bottom 11 to constitute therewith a collecting or distributing chamber 14. The constriction plate 13 may be of any suitable construction effective to allow the passage of liquid therethrough in both directions, even while positively supporting thereon the body "M" of ion exchange material in a state of subsidence.

Also provided within the tank is a horizontal grid structure 15 supported upon the tank wall at a height "H" above the constriction plate 13, which height "H" in fact also substantially defines the depth of the body or bed of exchange material when the same is in a state of subsidence. The grid structure 15 thus coinciding substantially with the top level of the bed will serve as a bed-restraining device for maintaining the particles thereof in a state of subsidence even against intensified upflow velocities, in conjunction with such particular operating conditions and measures as will be more fully described and explained further below. At the top of the tank there is provided an internal overflow or effluent launder 16 having a discharge connection 17 provided with a valve 18 for opening and closing this connection.

The tank is further provided with a draw-off header 19 for liquid upflowing through the bed from the bottom or constriction plate 13. One embodiment of such a draw-off header consists of a tube structure having porous wall formations through which the liquid may permeate into the interior of the tube, and a discharge connection 20 therefor, provided with a valve 21 for opening and closing that connection. This draw-off header 19 is spaced a clear distance "h" downwardly from the top level of bed of exchange material in the tank.

The treatment 10 cell is further provided with a supply connection 22 with control valve 23 at the top for feeding to the cell the working solution to be deionized. Also provided at the top is an air pressure supply connection 24 with control valve 25, for maintaining an air pressure cushion in the freeboard space above the liquid level in the cell. That is to say, controlled air pressure is maintained in the freeboard space during certain phases of the operating cycle in the practice of this invention, such as will be described in detail further below.

A vent connection 26 is also provided at the top, with control valve 27 for opening and closing the connections.

At the bottom of the cell, to communicate with the collecting and distributing chamber 14, there are provided further operating connections each individually valve-controlled, namely (a) a discharge connection 28 with control valve 29 for discharging treated or de-ionized solutions; (b) a supply connection 30 with control valve 31 for supplying wash water for back washing the bed at a rate to establish a sate of teeter, as well as for supplying rinse water for displacing residual regenerant solution from the bed; (c) a drain connection 32 with control valve 33 for discharging residual wash water at the end of the back washing phase; and (d) a supply connection 34 with control valve 35 for supplying regenerant solution.

There is further provided a liquid level indicating device 36 for the purpose of establishing and maintaining during certain operating phases in the cell a liquid level "L" to be held at an intermediate point between the horizontal draw-off header 19 and the horizontal grid structure 15, here designated by the distance "k" of level "L" from the grid structure 15 above. The distance "k" in fact substantially defines the depth of a zone "z" of semi-dry exchange material thus maintainable at the top of the bed, which together with the grid structure will serve in restraining the bed "M" to the extent of maintaining the same in a state of subsidence and confined under and by the grid structure 15.

The grid structure 15 itself may be in a variety of shapes and designs, an example of which (see Fig. 1 to 6) is here in the form resembling a checker board pattern. This may be described as consisting of a set of horizontal parallel angle members 37 spaced a distance "t" from one another, and another similar set of angle members 38 also spaced from one another the distance "t." Both sets of angle members 37 and 38 intersect with one another at right angles to constitute a rigid grid structure with the apex 39 of the angle members pointing upwardly. In view of the corrosive effects of the regenerant solutions, the grid structure 15 may consist of a suitable acid and alkali-resistant material, for example stainless steel or a plastic structural material, or else of rubber-covered steel structure.

It may be desirable to have this grid-structure vertically adjustable in parallel planes. According to one embodiment, sets of supporting or fastening lugs may be provided for that purpose at different elevations. Clearly, by varying the elevation of the grid structure it is possible to adjustably vary the distance "h" between the grid structure 15 and the draw-off header 19, and thereby to vary the potential effective depth of the semi-dry restraining zone "z" of ion exchange material at the top of the bed.

There will now be described the phases of the operating cycle proper of the ion exchange treatment cell by reference to the diagrammatic Figures 1 to 5, where the Figure 1 phase represents downflow deionization of the working solution, the Figure 2 phase represents upflow back washing the exhausted exchange material in a state of teeter, the Figure 3 phase represents the restoring, by drainage, of the exhausted material from the teeter condition to a state of subsidence, the Figure 4 phase represents the upflow regeneration of the bed by means of the regenerant solution, and the Figure 5 phase represents the upflow rinsing of the bed with rinse water to effect displacement from the bed of residual regenerant solution.

Referring to Figure 1, in the first phase of the treatment cycle, downflow deionization is effected by feeding the working solution (see arrow $A_1$) into the cell through the open valves 23 of supply connection 22, while valves 25 of air pressure connection 24 and valve 27 of vent connection 26 are closed. Also closed is the discharge valve 21 of draw-off header 19, as well as valves 31, 33, 35. But the valve 29 of connection 28 is open to the extent of allowing treated or deionized solution to discharge from the bottom of the cell at a controlled rate such as to maintain the bed of ion exchange material substantially submerged.

This downflow deionization treatment is continued until the bed will have become sufficiently exhausted, and it is stopped prior to where any appreciable leakage or breakthrough will occur of undesirable ions appearing in the effluent solution. Hence, at the end of this treatment phase the top strata of the bed is found to be substantially completely exhausted whereas the exhaustion of the bottom strata is incomplete.

Referring to Figure 2, in the second phase of the operating cycle, back-washing of the subsided or packed bed of exchange material is effected by upflowing therethrough wash liquid (see arrow $A_2$) at a rate sufficiently high to expand the bed upwardly through and beyond the grid structure 15 and into the freeboard space above, thus placing the particles of the material into a state of teeter. The depth of the expanded bed bears the designation $H_1$, whereas a clear water zone above bears the designation $H_2$ the upper limit of which zone is defined by the overflow edge of the internal discharge launder 16. That is to say, wash water enters at the bottom of the cell, namely through supply connection 30 and open valve 31. Wash water thus enters the distributing chamber 14 and rises through the constriction plate 13, past the draw-off header 19 and the grid structure 15 and the overflow launder 16 for discharge as spent wash water through open valve 18 of effluent connection 17. That is to say, only the valves 31 and 18 are open, while all others are closed. As the bed expands and while being sustained in its expanded state, there are established greater void spaces between the particles, yet the stratification with respect to the state of exhaustion thereof will shift or change only insignificantly as far as the systematic functioning of this operating cycle is concerned. This is significant in view of the fact that, subsequently the bed is allowed to subside again to its former volume confined by the grid structure 15, with the essential characteristics of exhaustion reestablishing themselves substantially the same as before. That is, except for some relatively insignificantly degree of re-arrangement or shifting, the top strata will still appear practically exhausted, whereas the exhaustion of the bottom strata will be incomplete.

Referring to Figure 3, in the third phase of the operating cycle, the state of subsidence of the particles of ion exchange material is restored by closing valve 31 to shut off the wash water supply, while opening drain valve 33 and also the vent valve 27, all other valves meanwhile being closed. The water is allowed to drain off (see arrow $A_3$) until it has reached a level "L" intermediate the grid structure 15 and the draw-off header 19 at which point the drain valve 33 is closed. The bed is thus conditioned for the subsequent phase of regeneration.

Referring to Figure 4, in the fourth phase of the operating cycle, regenerant solution is passed in upflow direction (see arrow $A_4$) through the bed under such controlled conditions that the liquid level "L" is maintained at a suitable elevation namely a distance below the grid structure 15, yet so as to keep the draw-off header 19 suitably submerged to an extent to enable the spent regenerant solution to pass through the porous walls thereof for discharge through the open valve 21 thereof.

That is to say, all but the valves 35 and 21 are closed. Meanwhile, however, the valve 25 is manipulated or controlled to admit air pressure to the cell and to maintain such pressure in a manner to hold the liquid level "L" at the desired elevation. In this way, by balancing the pressure of the air cushion against the surge of the regenerant solution, there is maintainable the zone "z" of semi-dry ion exchange material which according to this invention is needed for the purpose of restraining the bed against expansion by the upflowing regenerant solution. This manner of regeneration has the technical advantages and the efficiency, as initially indicated, substantially of what is known as the countercurrent method of regeneration. This is true for the reason that the upflowing fresh strong regenerant solution initially reacts with the incompletely exhausted exchange material, whereas subsequently rising through the bed it reacts with strata of material that are more and more fully exhausted even as the solution becomes increasingly spent. Hence, at the top of the bed, nearly exhausted material will still react effectively with the regenerant solution that has been spent to a large extent. The upflow of regenerant solution is stopped when the bed has been sufficiently regenerated, and the cell is now ready for the final phase of rinsing, that is the phase of displacing and washing residual regenerant solution from the bed even while the bed is maintained in its state of subsidence.

Referring to Figure 5, in the final phase of the operating cycle, rinsing of the bed, that is the displacement of the residual regenerant solution from the bed, is effected by upflow (see arrow $A_5$) through the bed of rinse water even as the liquid level "L" is being maintained by air pressure control in the free-board space. That is to say, rinse water is admitted at the bottom of the cell through the open valve 31 while the bed is kept in a state of subsidence by the joint effect of the top zone "z" of semi-dry material and the grid structure 15 imposed upon it. Spent rinse water leaves the cell by way of the draw-off header 19 and its open discharge valve 21. The rinsing completed, the cell is then again conditioned for the start of the next operating cycle, thus resuming de-ionization treatment of the working solution as illustrated in Figure 1.

Following is an example of operation which was carried out in a column or cell represented by a vertical tube of transparent plaster material such as Lucite, of 5½" inside diameter and 5'0" in height, closed at the top and at the bottom by suitable flange connected closure plates, and with a suitable constriction plate to support the bed of granular exchange material and constituting a false bottom relative to the bottom closure plate. Suitable inlet and outlet connections are provided at the top and at the bottom, as well as suitable draw-off means disposed at an inermediate level, namely about 2'6" above the bottom of the cell.

The bed restraining grid is in the form of a horizontal perforated plate to suit the inside diameter of the tube, provided with a vertical stem extending through the top closure plate in sealing relationship therewith, to provide for vertical adjustment of the perforated plate or grid. This grid plate is a disc having 68 holes each having a diameter of ¼".

The intermediate draw-off means or spent solution receiver is in the form of a box or window covered by brass screens of 40 mesh.

Bed expansion during upflow regeneration operation was duly prevented by the restraining grid if sufficient air pressure was maintained within the cell to overcome the pressure drop through the draw-off means at the upper portion of the bed.

The performance curve $C_1$ in Figure 7 of this example represents the efficiency of this method of upflow regeneration as compared with the performance curve $C_2$ of conventional downflow regeneration, that is in terms of throughput of solution in gallons as against leakage of ions (in percent) in the treated solution.

Curve $C_1$ for upflow regeneration comprises an initial portion $P_1$ of very shallow ascent and a steeply ascending end portion $P_2$, the two portions merging smoothly into one another. The upflow regeneration operation is conducted substantially within the range $P_1$ of curve $C'_1$, for the sake of attaining high efficiency with a minimum of leakage. Curve $C_1$ starts at about 1% leakage rising to about 5% leakage with about 63 gals. throughput, which is at the point "P" of intersection of curve $C_1$ with curve $C_2$.

Curve $C_2$ is drastically different from curve $C_1$ in that it comprises a declining initial portion $P_3$ and an ascending portion $P_4$, both portions merging smoothly with one another in the bottom portion of the curve. This curve starts at about 12% leakage, declining to a low of about 5% leakage, then to rise rather steeply towards "breakthrough."

For the purpose of this evaluation, the intersection point "P" may serve as a reference point in that it can be considered as defining the portion $P_1$ against the portion $P_2$ of curve $C_1$, and the portion $P_3$ against portion $P_4$ of curve $C_2$.

Each of the curves $C_1$ and $C_2$ represent an average of three separate operating runs, in each of which the following conditions were maintained:

Regeneration:
    Solution_____ 10% NaCl.
    Level_____ 15 lbs. NaCl/cu. ft. (resin).
    Flow rate_____ 0.66 G. P. M./cu. ft. (resin).
Rinse:
    Volume_____ 25 gal./cu. ft. (resin).
    Flow rate_____ 0.66 G. P. M./cu. ft. (resin).
Exhaustion:
    Solution_____ 0.1 N KCl.
    Flow rate_____ 2 G. P. M./cu. ft. (resin).
    Breakthrough_____ 10% leakage.

The following results were attained:

Downflow regeneration:
    Capacity—37.2 kilograms as $CaCO_3$/cu. ft. resin
    Average leakage—7.7%
Upflow regeneration:
    Capacity—41.9 kilograms as $CaCO_3$/cu. ft. resin
    Average leakage—2.7%

The capacities attainable with upflow regeneration were calculated in consideration of the fact that a certain amount of exchange material is ineffective inasmuch as the top zone "z" of semi-dry exchange material is not contacted by regenerant solution.

While the invention is herein illustrated by way of an ion exchange operating cycle in which the regenerating flow through the bed is upward and the de-ionizing flow is downward, it must be understood that the invention itself is by no means to be thus limited. That is to say, where desired these flow directions may be reversed so that regeneration flow is downward and de-ionizing flow is upward through the bed. In other words, with such reversal of the flow directions, the operational benefit of this invention accrues during the de-ionizing phase instead of during the regeneration phase.

It must also be understood that the invention is not limited or operationally dependent upon the inclusion of the Fig. 2 upflow backwashing bed-expansion step, inasmuch as that step could be omitted where the treatment of solutions of high purity is involved. In other instances, backwashing may be employed periodically, following a series of non-backwashing operating cycles. Also, the backwashing step may be employed at a suitable place in the operating cycle, other than the one illustrated in Fig. 2. For instance, such backwashing may be applied after the regeneration of Fig. 4 has taken place.

The improved cyclic ion exchange operation of this invention can be advantageously combined with the invention contained in patent to Roberts No. 2,484,647, which deals with a similar operating cycle in that it is based upon the upflow of the regenerant solution as combined with downflow of the working solution. In this patent the aim is to improve the efficiency of the operation as well as quality of the treated solution by way of altering the conditions of the upflow rinsing phase that follows regeneration. By the combined use of the present invention and that of the aforementioned Roberts Patent 2,484,647 there is attainable a significant cumulative improvement in overall operating efficiency of the treatment cycle as well as in the quality of the treated working solution resulting from the operation of that cycle.

Taking as an example the case of de-ionization treatment of raw water by passage sequentially through a cation exchange bed and an anion exchange bed, the aforementioned patent requires that at least the bottom portion of the ion exchange bed be kept free from those ions which the ion exchange material is to remove from the working solution for raw water. That is to say, the bottom portion of the bed is thus to be kept free of such ions at least during that period of operating cycle during which the residual regenerant solution is being displaced from the bed upwardly by the rinse water and the bed thus washed free from trailing regenerant solution. To attain that condition in the bed, the patent proposes upwardly displacing the residual regenerant solution by the use of a rinse water conditioned to be free from the ions in question, and to pass such conditioned rinse water upwardly through the bed subsequent to the upward passage therethrough of the regenerant solution. Therefore, in the case of the operation of the cation exchange bed, the rinse liquid must be conditioned to be cation free.

I claim:

1. The method of ion exchange treatment of a working solution passing through a bed of granular ion exchange material in an ion exchange treatment cell, which comprises (a) exhausting the bed by the passage therethrough of the working solution downward while the bed remains subsided; (b) backwashing the bed by an upflow of wash water therethrough at high enough velocity to expand the bed into a state of teeter and when backwashing is completed allowing the bed to subside; (c) regenerating the bed by upflow passage therethrough of regenerant solution while in subsidence; (d) after regeneration is completed rinsing the bed to displace residual regenerant solution therefrom, by passing therethrough an upflow of rinse water while maintaining subsidence; characterized thereby that said upflowing regenerant solution is withdrawn at a predetermined elevation spaced downwardly from the top level of the bed while air pressure is applied to be effective upon the liquid level of said solution and controlled in a manner to substantially maintain said solution level at said predetermined elevation, whereby there is maintainable a non-submerged top zone of said material and maintaining the top zone deep enough relative to the upflow velocity and throughput rate of said regenerant solution, to provide restraining effects upon the bed with respect to the tendency thereof to expand and teeter.

2. Apparatus for the ion exchange treatment of a working solution which comprises a closed treatment tank containing a bed of granular ion exchange material, providing substantial freeboard space above, said tank having at its upper portion a controllable upper supply connection for introducing said working solution to flow downwardly through the bed while the same is kept substantially in submergence, a controllable effluent connection at the bottom of the tank for discharging treated working solution, a controllable wash water supply connection at the bottom of the tank for introducing back wash water upflow through the bed at rates effective to expand the bed into a state of teeter, discharge means for spent back wash water at the top of the tank, intermediate liquid discharge means disposed below the top level of the bed a distance sufficient to provide thereby a top zone of potentially semi-dry material such as further defined below, a controllable connection at the bottom of the tank for the introduction of regenerant solution to pass upwardly through said bed for discharge through said intermediate liquid discharge means, a controllable compressed air supply connection for maintaining air pressure in the freeboard space of said tank and also for maintaining said aforementioned zone of semi-dry material at the top of the bed as a result of said air pressure acting upon the level of the regenerant solution passing through and from said intermediate discharge means, and a horizontal grid structure at the top level of the bed adapted to allow for upflow expansion of the bed therethrough during the back washing thereof, as well as adapted to act as a bed restraining means against upflow expansion tendency of the bed in maintaining effective said zone of semi-dry material of the bed.

3. The method of ion exchange treatment of a working solution passing through a bed of granular ion exchange material contained within an ion exchange treatment cell, which cell is adapted to permit the flow of solutions therethrough in upwardly and downwardly directions, which comprises steps (a) exhausting the bed by passing therethrough said working solution in one direction; (b) regenerating the bed by passing therethrough a regenerant solution in a direction opposite to said one direction of step (a); (c) rinsing the bed after regeneration is completed by passing therethrough a flow of rinse water; characterized thereby in that upflowing solutions are passed through said bed while said bed is in subsidence and said upflowing solutions are withdrawn at a predetermined elevation spaced downwardly from the top level of the bed while air pressure is applied to be effective upon the liquid level of said solutions and controlled in a manner substantially to maintain said solution level at said predetermined elevation whereby there is maintainable a non-submerged top zone of said material, and maintaining the top zone deep enough relative to the upflow velocity and throughput rate of said solution to provide restraining effect upon the bed with respect to the tendency of said bed to expand and teeter.

4. The method of ion exchange treatment according to claim 3 including the step of periodically backwashing the bed by an upflow of wash water therethrough at a high enough velocity to expand the bed into a state of teeter and allowing the bed to subside when backwashing is completed.

5. The method of ion exchange treatment according to claim 3 in which the working solution is passed through the bed in an upwardly direction and the regenerant solution is passed through the bed in a downwardly direction.

6. The method of ion exchange treatment according to claim 3 in which the working solution is passed through the bed in a downwardly direction and the regenerant solution is passed through the bed in an upwardly direction.

7. The method of ion exchange treatment according to claim 3 in which said rinse water is passed through the bed in an upwardly direction.

References Cited in the file of this patent
UNITED STATES PATENTS
2,268,607   McGill _____ Jan. 6, 1942